United States Patent [19]

Kobler et al.

[11] Patent Number: 4,935,683

[45] Date of Patent: Jun. 19, 1990

[54] RELATIVE ANGULAR POSITION ADJUSTMENT APPARATUS FOR A DRIVEN BODY OF ROTATION

[75] Inventors: Ingo Kobler, Anhausen; Valentin Gensheimer, Mühlheim, both of Fed. Rep. of Germany

[73] Assignee: MAN Roland Druckmaschinen AG, Offenbach am Main, Fed. Rep. of Germany

[21] Appl. No.: 385,669

[22] Filed: Jul. 26, 1989

[30] Foreign Application Priority Data

Jul. 26, 1988 [DE] Fed. Rep. of Germany ....... 3825307

[51] Int. Cl.$^5$ .............................................. G05B 1/06
[52] U.S. Cl. ..................................... 318/603; 318/611;
318/630; 318/640; 101/148; 101/350; 464/180;
464/182
[58] Field of Search ................................ 318/560–646;
101/120, 123, 124, 126, 137, 147, 148, 175, 234,
242, 350, 364; 192/50 R, 106.1, 106.2, 53 C;
464/36, 43, 45, 46, 64, 81, 68, 179, 180, 182,
166; 400/636.1, 639.1; 74/568 R

[56] References Cited

U.S. PATENT DOCUMENTS

| | | | |
|---|---|---|---|
| 3,886,424 | 5/1975 | Hoshina et al. | 318/604 |
| 3,955,377 | 5/1976 | Bendall | 464/180 |
| 4,315,199 | 2/1982 | Kyomasu et al. | 318/601 |
| 4,536,170 | 8/1985 | Downey | 464/182 |
| 4,641,070 | 2/1987 | Pfizenmaier et al. | 318/640 |
| 4,656,577 | 4/1987 | Herman | 318/603 X |
| 4,694,229 | 9/1987 | Cormack | 318/611 |
| 4,759,284 | 7/1988 | Haggard et al. | 101/148 |
| 4,809,606 | 3/1989 | Day et al. | 101/148 |

Primary Examiner—William M. Shoop, Jr.
Assistant Examiner—Paul Ip
Attorney, Agent, or Firm—Frishauf, Holtz, Goodman & Woodward

[57] ABSTRACT

To provide for fine-adjustment of the relative angular position of a driven body of rotation, such as a plate cylinder (1) of a printing machine, and having a driven shaft (21, 41) with respect to a driving shaft (9, 40), an axially shiftable intermediate shaft portion (14, 53) is positioned between the driving shaft (9, 40) and the driven shaft (21, 41) and the body of rotation, respectively. An elastic coupling structure (16, 24; 55, 57), for example a composite stacked leaf spring, and having the characteristic of being circumferentially stiff but axially flexible, couples the intermediate shaft, for axially shifting movement, between the respective shafts. Preferably, two such elastic coupling structures are provided. The intermediate shaft is axially shifted in response to changes in transmitted torque by a drive train from a drive motor (4) to the printing cylinder (1) under control of a torque responsive element, such as a strain gauge (37) coupled to a servo system which axially shifts the intermediate shaft portion, or by a torsion sleeve (46) which can twist in response to transmitted torque, the change in axial dimension upon twist of the torsion sleeve being transmitted through a hollow shaft to the intermediate shaft portion. Thus, circumferential register of the driven body of rotation, for example the printing machine cylinder (1) can be controlled in dependence on transmitted torque and register errors due to loading on the printing cylinder can be eliminated. The system is also applicable to other apparatus structures, such as rotary punches and the like.

17 Claims, 4 Drawing Sheets

RELATIVE ANGULAR POSITION ADJUSTMENT APPARATUS FOR A DRIVEN BODY OF ROTATION

The present invention relates to apparatus to adjust the relative angular position of a driven body of rotation with respect to a driving rotating body, such as a shaft, and more particularly to precision adjustment of this relative angular position; and especially to fine adjust the circumferential register of a cylinder, such as a plate cylinder, in a rotary printing machine.

Background. Various arrangements are known to control and adjust the circumferential position or register of a printing machine cylinder, typically a plate cylinder, with respect to another cylinder, or a driving shaft. Usually, a hand wheel or a positioning motor, controlled from a control panel, rotates a positioning spindle, the rotary movement of which is converted into an axial shifting of a gear with inclined or spiral gear teeth. The cooperation of the shiftable gear with another gear then causes the respective cylinder to be rotated as the axially shiftable gear is shifted in position.

Changes in loading on the cylinder cause differential torsion or torques to occur in the drive train of printing machine cylinders, which cause changes in circumferential position of a reference point of the cylinder with respect to the driving shaft. Thus, a plate cylinder may change its relative circumferential position with respect to the drive train upon change in loading thereon due to torsion effects within the drive train. Known arrangement cannot compensate for the deviations in circumferential register of the driven cylinder upon such torsional changes in the drive train.

The Invention. It is an object to provide an arrangement which, in simple manner, permits compensation of deviation of relative position of a driven rotary body with respect to a driving rotary body, such as a shaft, due for example to changes in loading on the driven rotary body; and more particularly to compensate for torsional effects of a drive train driving a cylinder, typically a plate cylinder of a printing machine upon variations in loading placed thereon.

Briefly, an axially shiftable intermediate shaft portion is positioned between the driving shaft and the driven body of rotation, such as a printing cylinder. Elastic coupling means are provided coupling the intermediate shaft portion to at least one of the shafts. The elastic coupling means have the characteristic that they are circumferentially stiff, but axially flexibly deformable; they are eccentrically secured, respectively, to the intermediate shaft portion and to the at least one shaft. Position control means are coupled to the intermediate shaft portion for controllably axially shifting the immediate shaft portion. Preferably, torque responsive means responsive to torque transmitted by the drive train, for example by the driving shaft or by a shaft coupled to the driven body of rotation, control the position control means in response to variations in transmitted torque.

DRAWINGS

Figures 6, 7:
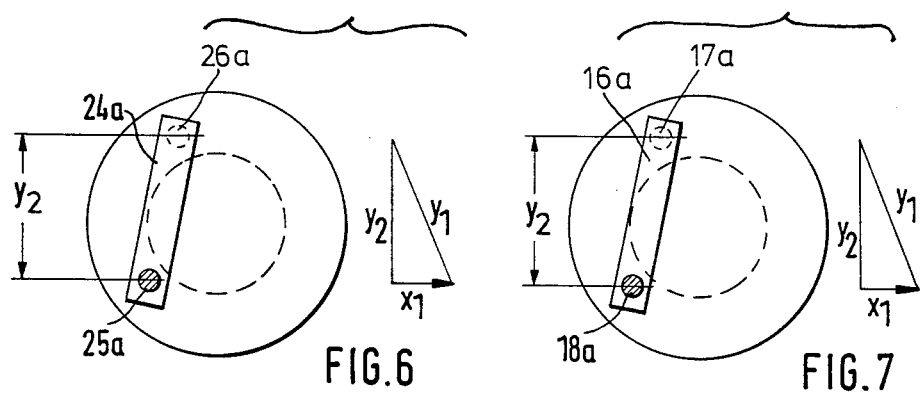
Figure 8:
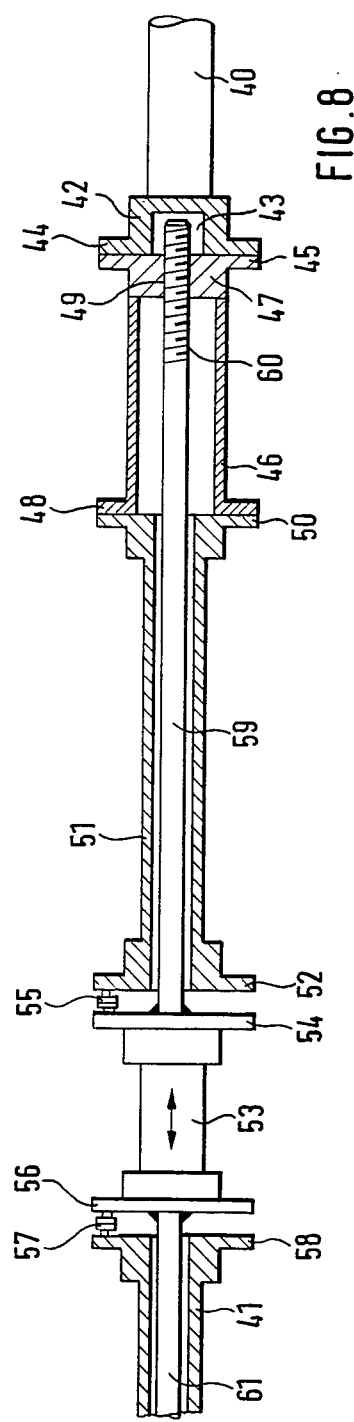
Figure 1:
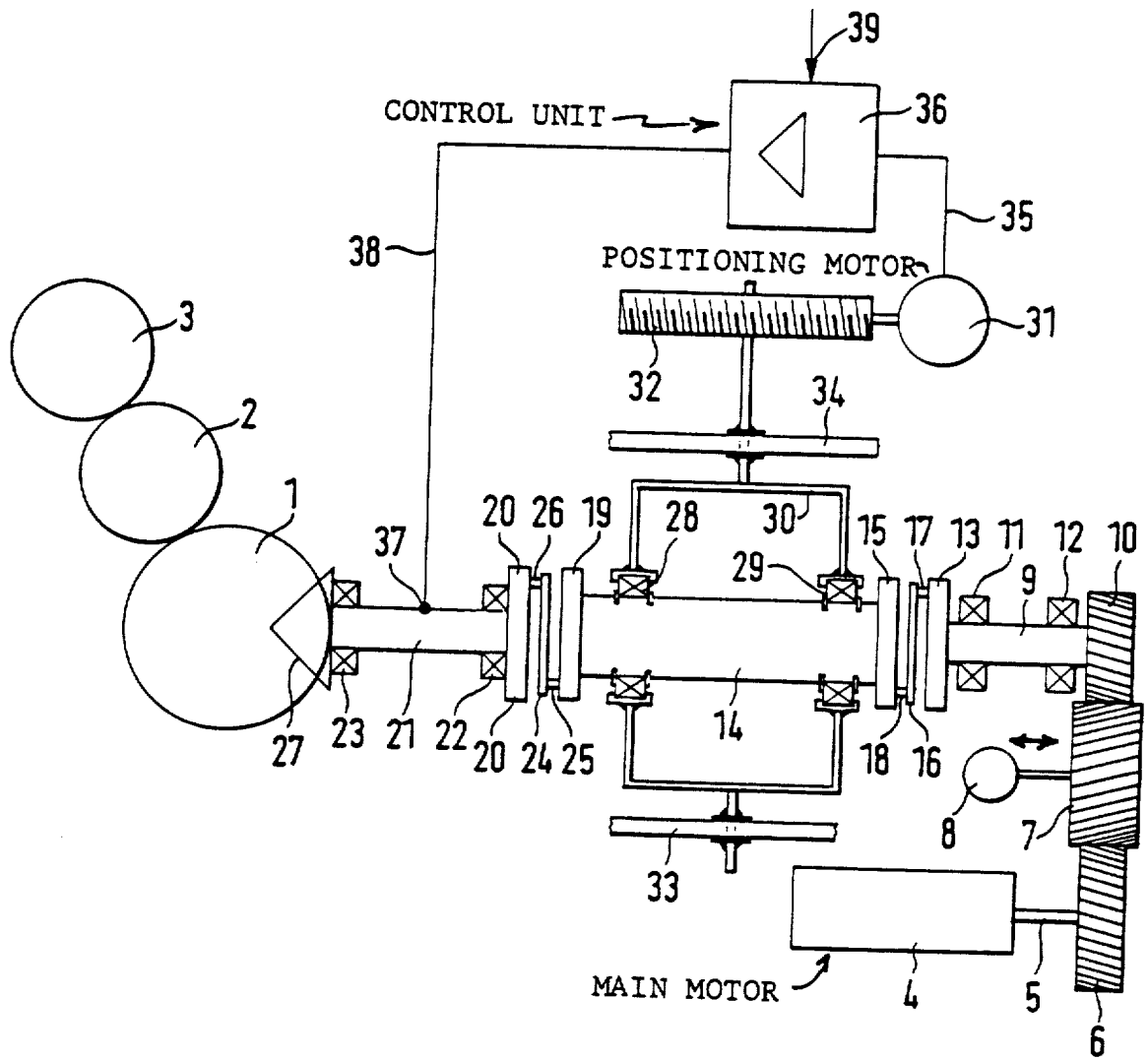
Figure 2:
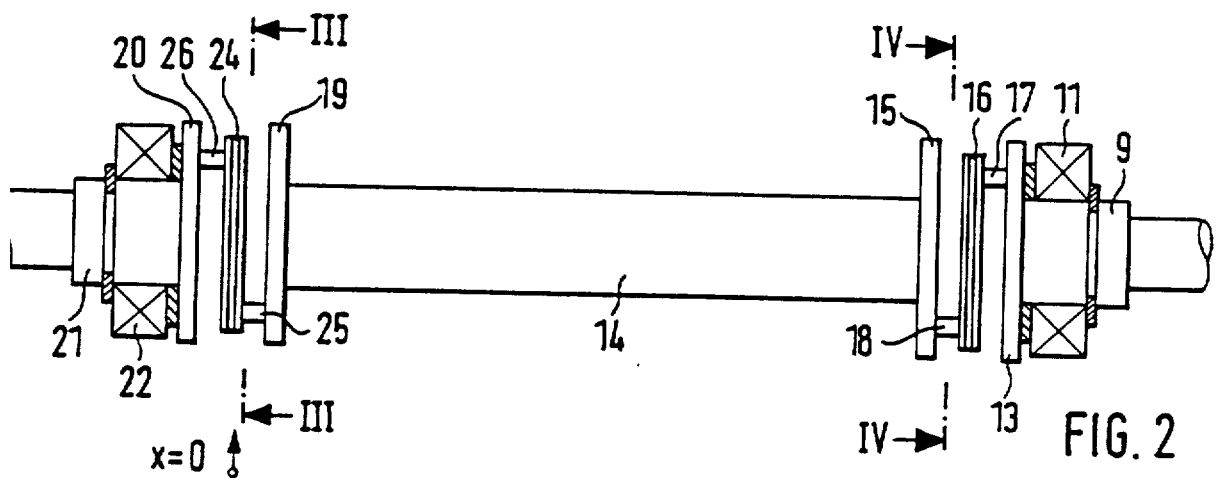
Figure 3:
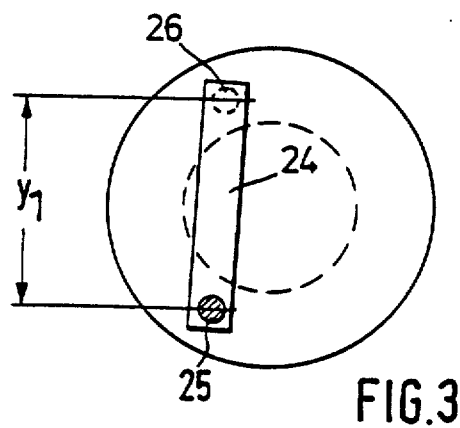
Figure 4:
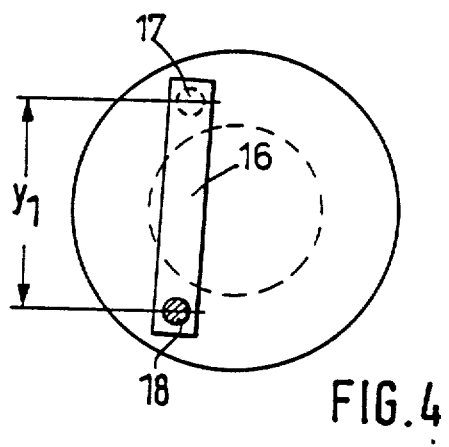
Figure 5:
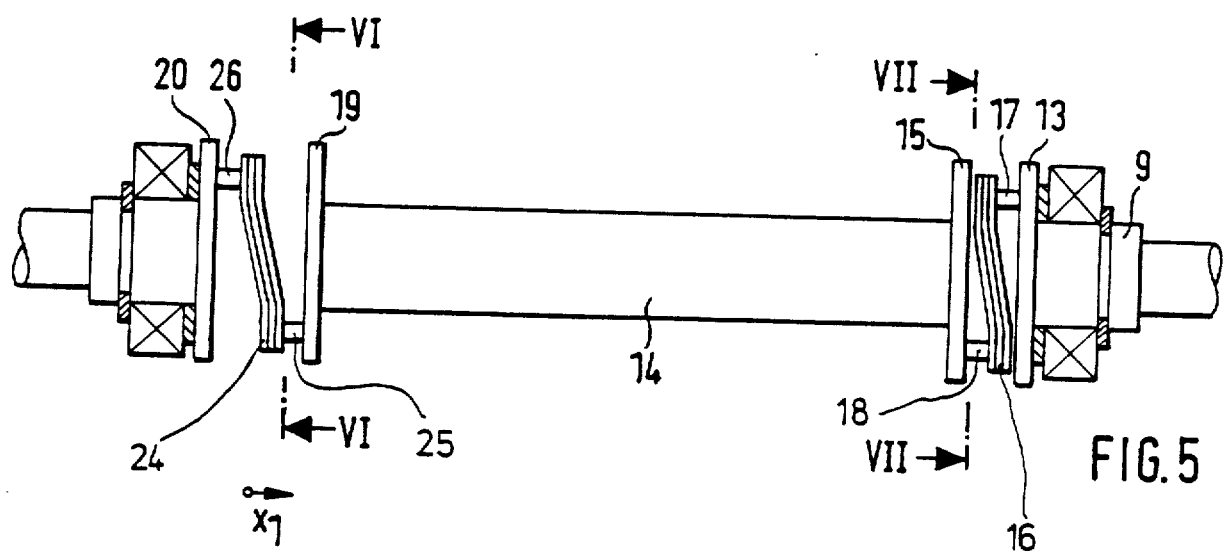
Figures 6, 7:
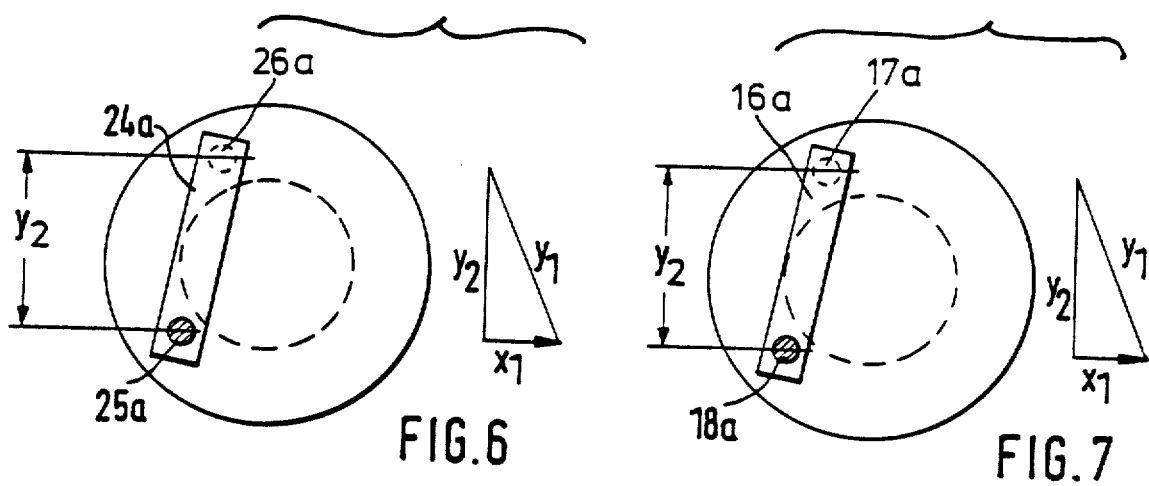
Figure 8:
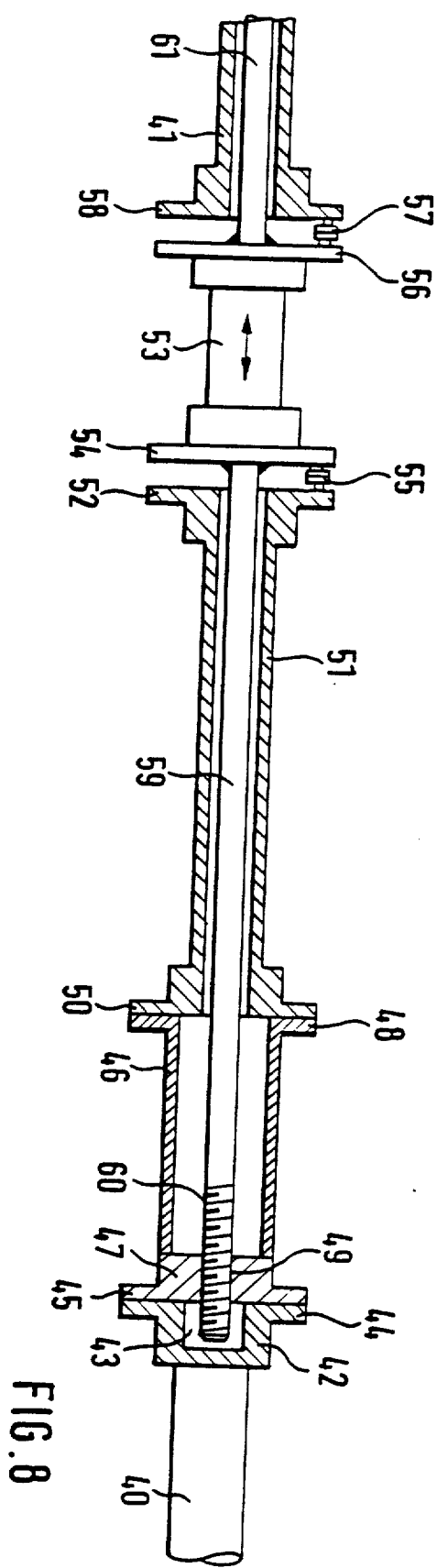

FIGS. 6 and 7 are end views taken along section lines VI—VI and VII—VII, respectively, and illustrate the position of the flexible elements upon axial shifting of the intermediate shaft, and also show diagrams representing the distance of the pins on the flexible elements; and FIG. 8 illustrates a purely mechanical compensation apparatus to compensate for torque or torsion dependent change in register position between a driven element and a driving element.

DETAILED DESCRIPTION.

The invention will be described in connection with registered control of a plate cylinder of a printing machine, which forms one application of the present invention; the invention is not limited, however, to this particular use but can be used, basically, with all types of apparatus and machinery in which the relative angular position of a driven body of rotation with respect to the drive system or drive train thereof is of importance. Another example of use, for example, is a rotating punching cylinder of a punching machine, for example a cardboard punching machine.

Figure 1:
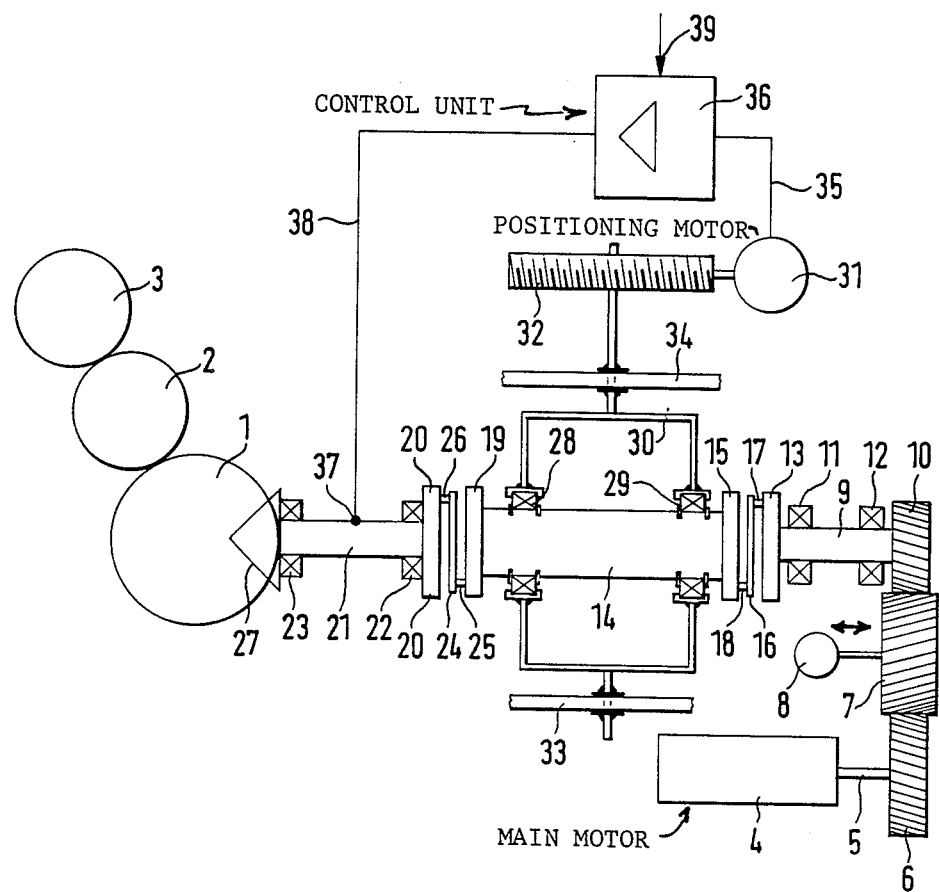
FIG. 1 is a schematic representation of a drive train for cylinders of a rotary printing machine and having an electrical measuring apparatus controlling torque and torsion related deviations in circumferential register between the drive train and the printing machine cylinders.

Referring now to FIG. 1:

A printing machine system, as shown highly schematically, has a plate cylinder, a rubber blanket cylinder 2 and an impression cylinder 3. This printing system can be part of a rotary printing machine, of any suitable construction, and not further shown. The plate cylinder 1 is driven by a drive train located along a side wall of the printing machine, as well known, and powered by a main power drive motor 4.

The main motor 4 has a motor shaft 5 coupled to a spiral gear 6. Spiral gear 6 is in driving engagement with a spiral gear 7, the axial position of which can be adjusted by a positioning motor 8. A further spiral gear 10, secured to an axially immovable shaft 9, is in engagement with the axially adjustable gear 7. The shaft 9 is held in axially fixed position by two bearings 11, 12 and, at the side remote from gear 10, is coupled to or formed with a flange 13 having a diameter substantially larger than the diameter of the shaft 9.

In accordance with a feature of the invention, an intermediate shaft 14 is located coaxially with respect to the shaft 9. The end of the intermediate shaft 14 facing shaft 9 is formed with, or attached to a flange 15, coaxial with and preferably of the same diameter as flange 13. The flanges 13, 15 are spaced apart.

In accordance with a feature of the invention, an elastically deformable spring element 16 is located between the flanges 13, 15, and coupled to the respective flanges by pins 17 and 18, respectively. The spring element 17 has the characteristic that it is axially elastically deformable, while being stiff and resistant to rotation in circumferential direction. The pins 17, 18 and located at opposite sides of the spring element 16 and secured to the respective flanges 13, 15 eccentrically, that is, at circumferential positions remote from the center of the shafts 9 and 14.

The left side, with respect to FIG. 1, of shaft 14 has a flange 19 secured thereto or formed thereon which, preferably, is of the same diameter as flange 15; flange 19, coaxially thereto, faces a flange 20 which is secured to a driven shaft 21. The driven shaft 21 is held in fixed axial position by two bearings 22, 23. The flanges 19, 20 are coupled by a spring element 24 which is secured to the respective flanges by pins 25, 26, located eccentrically with respect to the center of the axes of shafts 9, 14, 21. The spring element 24, like spring element 16, is circumferentially stiff, or essentially non-deflectable while being axially elastically deformable. The spring elements 16, 24 are coupled to the respective flanges by the pins in a crank-like arrangement.

The left end of the shaft 21 is coupled to a conical gear 27 which drives the plate cylinder 1, as well known in the printing machine cylinder drive field.

The intermediate shaft 14 is coupled to two bearings 28, 29 in such a manner that the shaft 14 can rotate freely, while bearing axially shifted by movement of the bearings 28, 29 axial direction.

In the embodiment illustrated in FIG. 1, bearings 28, 29 coupled to a bridge structure 30. The bridge structure 30 is, in turn, coupled to a spindle nut which is in threaded engagement with a threaded spindle 32, rotated by a positioning motor 31. The bridge element 30 is guided for shifting movement in respective guideways 33, 34, for example guide rods located within suitable guide sleeves, the guide rods extending parallel to the axis of rotation of the shafts 9, 14 and 21.

Operation of the positioning motor 31 is commanded via a control line 35 which receives operating power from a control unit 36, which may, for example, include an amplifier as shown schematically. Additionally, the control unit 36 includes the necessary control functions for the motor 31, such as a power amplifier and a logic circuit. Operating control for the motor 31 is derived via an input control line 38 coupled to a torsion transducer 37 which, for example, is in form of a strain gauge coupled to the shaft 21 and transmitting output signals, for example by a non-contacting transmission element to the line 38. The strain gauge 37 is so located on the shaft 21 that torsional twist of the shaft element 21 results in a proportional change in an electrical characteristic, for example the resistance of the strain gauge element. Such strain gauge elements are standard articles of commerce and can be coupled by suitable coupling arrangements to a fixed pick-up, for transmission of strain-representative signals via line 38 to the control unit 36.

OPERATION

Plate cylinder 1 is driven from the main motor 4 via gear 6, gears 7, 8, shaft 9, intermediate shaft 14, shaft 21 and the bevel gear 27. The spring elements 16, 24 transfer torque between the shafts 9, 14 and 21. The circumferential register of the plate cylinder 1 with respect to the circumferential position of gear 6 is controlled, for example from a control panel, by energizing the motor 8. Motor 8 axially shifts the spiral gear 7 which causes movement of the inclined flanks of the gear 7 with respect to the inclined flanks of the gear 10 and gear 6. Thus, a rotary movement is superposed on the rotation of the cylinder 1 on and above the rotation caused by the main motor 4.

Load-dependent changes in the relative angular position of the driving shaft 9 and the driven plate cylinder 1, in accordance with a feature of the invention, are sensed by the strain gauge 37. The strain gauge 37 need not be placed on the shaft 21, but can be placed at any other position within the drive train system 5–21. The strain gauge 37 senses load-dependent twist or torsion in shaft 21, which is representative of load-dependent torsion or twist in all the components of the drive train. Thus, a positioning signal can be derived from the strain gauge 37 which is representative of the overall torsional twist of the rotating components in the drive train.

The positioning motor 31, under control of signals derived from the strain gauge 37, rotates the spindle 32 which is coupled to the bridge 30 and thus shifts the intermediate shaft 14 by the axial distance shown in FIGS. 6 and 7 at $x_1$.

Figure 2:
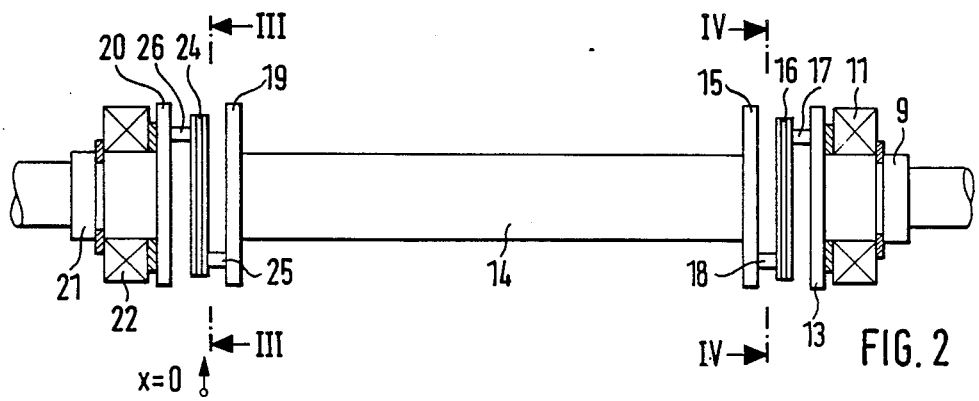
FIG. 2 is an enlarged fragmentary view illustrating the register adjustment apparatus, with the shaft stopped.
Figure 3:
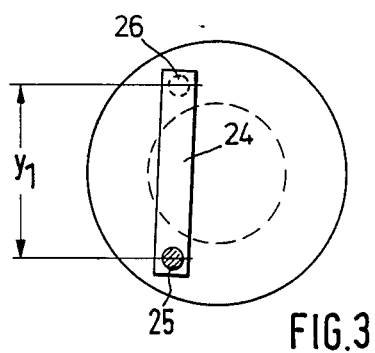
FIGS. 3 and 4 are, respectively, side views taken along the section lines III—III and IV—IV, respectively, of the flexible coupling means coupled to the intermediate shaft.
Figure 4:
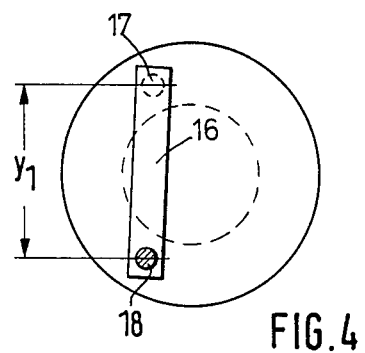

FIG. 2 illustrates, to an enlarged scale, the intermediate shaft 14 in neutral, stopped or non-shifted position in which $x=0$. The spring elements 16, 24 are in straight, stretched position, located in a plane perpendicular to the axis of rotation of the intermediate shaft 14. The pins 17 and 18 as well as pins 25, 26 are spaced from each other $y_1$—see FIGS. 3 and 4.

Figure 5:
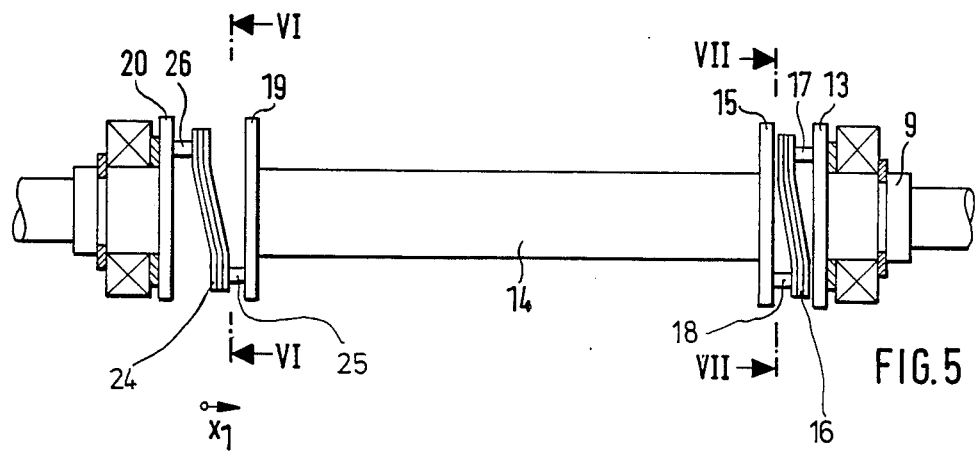
FIG. 5 is a view similar to FIG. 2 and illustrating the position of the apparatus upon axial shifting of the intermediate shaft.

Referring now to FIG. 5, which shows the position of the spring elements and of the intermediate shaft 14 upon movement of the bridge 30 out of the zero or null position, it will be seen that the shaft 14 has been shifted by a distance $x_1$ in axial direction with respect to the zero position shown in FIG. 2. This changes the vertical spacing of the pins 25, 26 and 17, 18, respectively, to a different, namely $y_2$. The vector diagrams forming part of FIGS. 6 and 7 illustrate the relationship of the distance $y_1$, $y_2$ and $x_1$. The pins 18, 25 on the central or intermediate shaft 14 travel, due to the eccentric attachment of the springs 16, 24 on the flanges, to the new positions shown in FIGS. 6 and 7 at 25a, 18a, respectively, different from the positions 25, 8 in FIG. 2. This rotates the intermediate shaft portion 14 which, due to the torsionally stiff construction or characteristics of the spring elements, is intended to be transferred also to the respective adjacent shafts 9 and 21. The shaft portion 9, however, due to its coupling to the main motor 4 via the gears 10, 7, 6 is fixed in circumferential direction, so that the rotary movement is entirely transferred to the shaft 21 coupled to the plate cylinder 1. The pins 17, 18 and 25, 26, as seen in FIGS. 6 and 7, shifted to the positions shown at 25a, 26a, 18a, 17a upon axial deflection of the springs 24, 16, as shown at 24a, 16a in FIGS. 6 and 7, are derived from the axial shifting of the intermediate shaft 14. The pins 17, 18 and 25, 26 are so located on the flanges 13, 15 and 19, 20, respectively, that an axial shift of the intermediate shaft 14 results in reset forces applied to the two springs elements which form a force pain in the same direction of rotation.

The control unit 36, by suitable selection of its transfer function of signals from strain gauge 37 to control of the positioning motor 31 can thus provide for very fine adjustment to compensate for load-dependent torsion within the drive train from motor 4 to the plate cylinder 1.

Control of register can be entirely based on torsional or twisting loading of the respective shafts, derived from the strain gauge 37; in accordance with a feature of the invention, fine correction of circumferential register can also be introduced manually by providing a manual input 39 to the control unit 36. Circumferential correction by axially shifting shaft 14 can be much finer than the circumferential register adjustment obtainable from axially shifting gear 7 under control of positioning motor 8. Thus, the apparatus is suitable to compensate for load-dependent torsion, and additionally to provide for fine-adjustment of circumferential register by suitably controlling input signals to control unit 36 via input line or terminal 39.

It is not necessary that the shaft 14 carry flanges 15, 19 at both its ends, with springs 16, 24 coupled thereto. Thus, fine-adjustment can also be obtained if only one side, for example the left side of the shaft 14, carries a spring element 24 for coupling to the adjacent shaft 21. The right side of the shaft 14 can then be coupled to shaft 9 via any other arrangement capable of transferring torque while permitting axial shifting; for example the intermediate shaft 14 may have an external polygonal shape fitted, telescopically, into a matching polygonal hollow shaft portion 9, or otherwise be axially slidably splined to shaft portion 9.

EMBODIMENT OF FIG. 8

Compensation of load-dependent torsion can also be obtained by a purely mechanical arrangement. A shaft 40, driven, similar FIG. 1 from a motor 4 and corresponding essentially to shaft 9 of FIG. 1, is coupled by a torsioncompensating system to a shaft 41 which corresponds to the shaft 21 of FIG. 1. Shaft 41 then transfers torque to the plate cylinder 1.

The shaft 40, at its left side, is coupled to or formed with a flange 42 which has an interior hollow cylindrical space 43 and an external flange ring 44. Flange ring 44 is coupled to a flange ring 45 of a torsion element 46.

The torsion element 46 is formed as a thin-walled cylindrical sleeve which, at the right side, is secured to a plate 47 coupled to or formed with the flange 45. The left side of the sleeve 46 is coupled to or forms an externally projecting flange 48. Plate 47 is formed with a central threaded bore 49. A hollow shaft 51 is formed at the right side with a flange 50, which is secured to the flange 48 on the torsion body 46. The left side of the hollow shaft 51 is coupled to or formed with a flange 52. Flange 52 is coupled to a flange 54 of an intermediate shaft portion 53 by a spring element 55. The intermediate shaft 53 carries, at the left side, a flange 56, facing flange 58 coupled to or formed on the shaft 41. A spring element 57 couples flange 56 to flange 58, and hence completes the driving connection between shaft 40 and shaft 41.

In accordance with a feature of the invention, spring elements 55 and 57, only schematically shown in FIG. 8, have the same characteristic as spring elements 16, 24, namely axially yieldably deflectable, while being circumferentially stiff. They may be identical to the leaf spring elements or, preferably, multiple or stacked leaf spring elements shown in FIGS. 2 to 7 in detail. For example, they may be a package of steel strips or lamellae, forming a composite leaf spring, in which the respective lamellae or steel strips have essentially rectangular cross section. Other spring arrangements may be used.

Axial shifting of the intermediate shaft 53, illustrated by the double arrow in shaft 53, is not obtained externally but, rather, controlled by a rod 59 passing through the hollow shaft 51 and connected, centrally, to flange 54 of the intermediate shaft 53, that is, concentric with the axis of rotation thereof. The rod 59 also extends internally of the torsion body or sleeve 46; at its right end, it is formed with an external thread 60, threaded into the bore 49 in body or plate 47. The rod 59, with its threaded end 60, has freedom to enter the hollow cylindrical space 43 within the flange structure 42-44.

OPERATION

Torque transmitted from the main drive motor 4 (FIG. 1) to the shaft 40 results in proportional twists of the torsion body 46. Since, together with the torsion body 46, plate 47 with the threaded bore 49 also rotates, the intermediate shaft 53, coupled to the rod 59, will have, respectively and simultaneously, a pulling and pushing or straining and pressure force applied thereto by the thread 60 on the rod 59. This force results in axial shifting of the intermediate shaft 53. Since the spring elements 55, 57 are eccentrically located on the respective flanges 52, 54 and 56, 58, the intermediate shaft 53 will be rotated in the same manner as in the embodiment discussed in connection with FIGS. 1 and 2-7.

Precise compensation of torsional twist due to changes in loading on the drive train can be obtained by suitable selection of pitch of the threads 49, 60 in relation to the twist of the torsion body 46 under twist or torque loading. Since such twist, in dependence on torque loading, is known or can be readily determined, the shift necessary to compensate for torque-dependent and load-dependent twist of the rotary elements in the drive train can be readily determined.

Additionally rod 61 can be coupled to the intermediate shaft 53, secured to flange 56, as shown in FIG. 8. Axial movement of the intermediate shaft 53 thus can be transferred to further intermediate shafts, coupled with suitable spring elements similar to spring elements 16, 24 and 55, 57 to the shaft 41. The shaft 41, then, is formed as a hollow shaft. By cascading a plurality of intermediate shafts and spring elements, extremely fine compensation of angular deviation of the driven body with respect to a driving shaft can be obtained.

Various changes and modifications may be made and any features described herein in connection with any one of the embodiments may be used with any of the others, within the scope of the inventive concept.

We claim:

1. Apparatus for fine-adjustment of the relative angular position of a driven body of rotation (1, 21, 41, 58) with respect to a driving shaft (5, 9, 40),
    especially of the position of a printing cylinder (1) of a printing machine with respect to a drive train (4–7, 9, 10) including the driving shaft,
    said driven body of rotation including a driven shaft (21, 41),
    comprising
    an axially shiftable intermediate shaft portion (14, 53) positioned between the driving shaft (9, 40) and the driven body of rotation;
    elastic coupling means (16, 24; 55, 57) coupling the intermediate shaft portion to at least one of said shafts,
    said elastic coupling means having the characteristic of being circumferentially stiff but axially flexibly deformable, said elastic coupling means being eccentrically secured to, respectively, the intermediate shaft portion and the at least one of said shafts; and
    a position control means (30; 59) coupled to said intermediate shaft portion for controllably axially shifting the intermediate shaft portion.

2. The apparatus of claim 1, further including torque-responsive means (37, 36, 31, 32; 46) responsive to torque being transmitted by the driving shaft to the driven shaft via said intermediate shaft portion, said torque-responsive means being connected and coupled to said position control means for axially shifting the intermediate shaft portion (14, 53) as a function of and in response to variations of transmitted and sensed torque.

3. The apparatus of claim 1, wherein the intermediate shaft portion (14, 53) includes two end sections at either ends of said intermediate shaft portion, and wherein one each of said elastic coupling means are coupled to respective ends of said intermediate shaft portion;

and wherein the elastic coupling means includes spring means (16, 24; 55, 57) so coupled to the intermediate shaft portion (14, 53) that, upon axial shifting of the intermediate shaft portion, reset forces for balanced positioning of the elastic coupling means is obtained due to force pairs effective and operative in the same direction of rotation.

4. The apparatus of claim 1, wherein said position control means (30) comprises
a torsion sensor (37) coupled to one of the shafts in a drive train from a main motor (4) to said driven body of rotation;
serve positioning means (38, 36, 35, 31, 32) receiving signals from said torsion sensor and coupled to said intermediate shaft portion (14) for axially shifting the intermediate shaft portion in response to torsion signals transmitted by said torsion sensor.

5. The apparatus of claim 4, wherein said torsion sensor is located in a portion of the drive train between the intermediate shaft portion (14) and the driven body of rotation.

6. The apparatus of claim 4, wherein the servo positioning means includes
a positioning motor (31);
a motor control unit (36) coupled to receive input signals from said torsion sensor (37) and controlling rotation of the positioning motor (31);
a positioning spindle (32) coupled to the positioning motor;
a lateral shifting coupling (30) coupled to said spindle, said shifting coupling being guided for shifting movement in a direction parallel to the axis of rotation of the intermediate shaft portion;
and bearings (28, 29) axially fixed on said intermediate shaft portion (14) and coupled to said lateral shifting coupling (30) for axially shifting the intermediate shaft portion.

7. The apparatus of claim 4, wherein said torsion sensor (37) comprises a strain gauge or strain sensor (37).

8. The apparatus of claim 2, wherein said position control means and said torque-responsive means comprises
a thin-walled cylindrical torsion element (46) coupled to said intermediate shaft at an end facing the driving shaft, and connecting the intermediate shaft and the driving shaft, said thin-walled torsion element (46) being in form of a hollow sleeve and including inwardly thereof a transversely extending essentially rigid plate (47) formed with a threaded bore;
a push rod (59) having a thread (60) engaged in said threaded bore and extending through the hollow torsion element (46);
a hollow coupling means (50, 51, 52) coupled to the hollow torsion element, the push rod (59) extending through said hollow coupling means, said elastic coupling means (55) being connected to said hollow coupling means, said push rod (59) being secured to said intermediate shaft portion (53) and, upon twist of said torsion element (46), in response to transmitted torque, axially moving said intermediate shaft portion.

9. The apparatus of claim 5, wherein the intermediate shaft portion (14, 53) includes two end sections at either ends of said intermediate shaft portion, and wherein one each of said elastic coupling means are coupled to respective ends of said intermediate shaft portion;

and wherein the elastic coupling means includes spring means (16, 24; 55, 57) so coupled to the intermediate shaft portion (14, 53) that, upon axial shifting of the intermediate shaft portion, reset forces for balanced positioning of the elastic coupling means is obtained due to force pairs effective and operative in the same direction of rotation.

10. The apparatus of claim 8, wherein the intermediate shaft portion (14, 53) includes two end sections at either ends of said intermediate shaft portion, and wherein one each of said elastic coupling means are coupled to respective ends of said intermediate shaft portion;

and wherein the elastic coupling means includes spring means (16, 24; 55, 57) so coupled to the intermediate shaft portion (14, 53) that, upon axial shifting of the intermediate shaft portion, reset forces for balanced positioning of the elastic coupling means is obtained due to force pairs effective and operative in the same direction of rotation.

11. The apparatus of claim 1, wherein said elastic coupling means comprises a leaf spring means of essentially rectangular cross section.

12. The apparatus of claim 1, wherein said elastic coupling means comprises a plurality of steel leaf spring lamellae (16, 24; 55, 57) of essentially rectangular cross section, said lamellae being stacked together to form a composite spring package.

13. The apparatus of claim 11, wherein said leaf spring means are elongated elements attached, eccentrically with respect to the axis of rotation of said intermediate shaft, respectively to an end flange of said intermediate shaft and an end flange of said at least one of said shafts and facing the end flange of the intermediate shaft.

14. The apparatus of claim 13, wherein the intermediate shaft portion (14, 53) includes two end sections at either ends of said intermediate shaft portion, and wherein one each of said elastic coupling means are coupled to respective ends of said intermediate shaft portion;

and wherein the elastic coupling means includes spring means (16, 24; 55, 57) so coupled to the intermediate shaft portion (14, 53) that, upon axial shifting of the intermediate shaft portion, reset forces for balanced positioning of the elastic coupling means is obtained due to force pairs effective and operative in the same direction of rotation.

15. In a printing machine,
an apparatus for fine-adjustment of the angular position of a printing machine cylinder (1) forming a driven body of rotation (1, 20, 21; 41, 58) and including a driven shaft (21, 41) coupled thereto, with respect to a driving shaft (9, 40), said apparatus comprising an axially shiftable intermediate shaft position (14, 53) positioned between the driving shaft (9, 40) and the driven body of rotation;

elastic coupling means (16, 24; 55, 57) coupling the intermediate shaft portion to at least one of said shafts, said elastic coupling means having the characteristic of being circumferentially stiff but axially flexibly deformable, said elastic coupling means being eccentrically secured to, respectively, the intermediate shaft portion and the at least one of said shafts;

a position control means (30; 59) coupled to said intermediate shaft portion for controllably axially shifting the intermediate shaft portion; and torque-responsive means (37, 36, 31; 32, 46) responsive to torque being transmitted by the driving shaft to the driven shaft via said intermediate shaft portion, said torque-responsive means being connected and coupled to said position control means for axially shifting the intermediate shaft portion (14, 53) as a function of and in response to variations of transmitted and sensed torque.

16. The apparatus of claim 15, wherein said position control means (30) comprises a torsion sensor (37) coupled to one of the shafts in a drive train from a main motor (4) to said driven body of rotation;

servo positioning means (38, 36, 35, 31, 32) receiving signals from said torsion sensor and coupled to said intermediate shaft portion (14) for axially shifting the intermediate shaft portion in response to torsion signals transmitted by said torsion sensor.

17. The apparatus of claim 15, wherein said position control means and said torque-responsive means comprises a thin-walled cylindrical torsion element (46) coupled to said intermediate shaft at an end facing the driving shaft, and connecting the intermediate shaft and the driving shaft, said thin-walled torsion element (46) being in form of a hollow sleeve and including inwardly thereof a transversely extending essentially rigid plate (47) formed with a threaded bore;

a push rod (59) having a thread (60) engaged in said threaded bore and extending through the hollow torsion element (46);

a hollow coupling means (50, 51, 52) coupled to the hollow torsion element, the push rod (59) extending through said hollow coupling means, said elastic coupling means (55) being connected to said hollow coupling means, said push rod (59) being secured to said intermediate shaft portion (53) and, upon twist of said torsion element (46), in response to transmitted torque, axially moving said intermediate shaft portion.

* * * * *

UNITED STATES PATENT AND TRADEMARK OFFICE
CERTIFICATE OF CORRECTION

PATENT NO. : 4,935,683　　　　　　　　　　　　　Page 1 of 5

DATED : June 19, 1990

INVENTOR(S) : KOBLER et al

It is certified that error appears in the above-identified patent and that said Letters Patent is hereby corrected as shown below:

Sheet 1 of 5 of the drawings in the patent document should be replaced with the attached four (4) sheets of drawings (Fig.1-8).

Signed and Sealed this

Twelfth Day of May, 1992

Attest:

DOUGLAS B. COMER

*Attesting Officer*　　　　Acting Commissioner of Patents and Trademarks